United States Patent
Sujan et al.

(10) Patent No.: US 11,608,051 B2
(45) Date of Patent: Mar. 21, 2023

(54) METHOD AND SYSTEM FOR A HYBRID POWER CONTROL IN A VEHICLE

(71) Applicant: Cummins Inc., Columbus, IN (US)

(72) Inventors: Vivek A. Sujan, Columbus, IN (US); Jeffrey A. Green, Columbus, IN (US); Thomas M. Yonushonis, Columbus, IN (US); Timothy J. Proctor, Columbus, IN (US); Daniel R. Dempsey, Columbus, IN (US); David W. Ochs, Greenwood, IN (US); Thomas R. Marsh, Edinburgh, IN (US); James R. Nebergall, Columbus, IN (US); J. Steven Kolhouse, Columbus, IN (US)

(73) Assignee: CUMMINS INC., Columbus, IN (US)

(*) Notice: Subject to any disclaimer, the term of this patent is extended or adjusted under 35 U.S.C. 154(b) by 233 days.

(21) Appl. No.: 15/930,655

(22) Filed: May 13, 2020

(65) Prior Publication Data

US 2020/0361444 A1     Nov. 19, 2020

Related U.S. Application Data

(60) Provisional application No. 62/846,996, filed on May 13, 2019.

(51) Int. Cl.
*B60W 20/00*     (2016.01)
*B60W 20/16*     (2016.01)
(Continued)

(52) U.S. Cl.
CPC ............ *B60W 20/16* (2016.01); *B60W 20/12* (2016.01); *B60W 50/0097* (2013.01);
(Continued)

(58) Field of Classification Search
CPC .. B60W 20/16; B60W 20/12; B60W 50/0097; B60W 2530/10; B60W 2554/40; B60W 2555/20; B60W 2555/40; B60W 2556/10; B60W 2556/55; B60W 2552/15; B60W 2556/45; B60W 2710/0694; B60W 20/40; F01N 11/00; F01N 9/007; F01N 2610/02; F01N 2610/146; F01N 2900/10; F01N 2900/12; F01N 2900/1602; F01N 2900/1812; F01N 3/208; F01N 2590/11; F02D 41/0235; F02D 41/1445;
(Continued)

(56) References Cited

U.S. PATENT DOCUMENTS

| | | |
|---|---|---|
| 7,240,750 B2 | 7/2007 | Patel |
| 7,958,958 B2 | 6/2011 | Torree-Bueno |

(Continued)

FOREIGN PATENT DOCUMENTS

WO     2008128416 A1     10/2008

*Primary Examiner* — Peter D Nolan
*Assistant Examiner* — Peter Y Ning
(74) *Attorney, Agent, or Firm* — Faegre Drinker Biddle & Reath LLP

(57) ABSTRACT

Methods and systems for improving fuel economy and reducing emissions of a vehicle with an electric motor, an engine, an energy storage device, and a controller are disclosed. The method includes obtaining current state information including a current hybrid control surface, and determining a target hybrid control surface for the vehicle based on the current state information.

20 Claims, 14 Drawing Sheets

(51) Int. Cl.

| | | |
|---|---|---|
| *B60W 50/00* | (2006.01) | |
| *B60W 20/12* | (2016.01) | |
| *F02D 41/02* | (2006.01) | |
| *F01N 11/00* | (2006.01) | |
| *B60K 6/26* | (2007.10) | |
| *B60K 6/42* | (2007.10) | |

(52) U.S. Cl.
CPC .......... *F01N 11/00* (2013.01); *F02D 41/0235* (2013.01); *B60K 6/26* (2013.01); *B60K 6/42* (2013.01); *B60W 2530/10* (2013.01); *B60W 2554/40* (2020.02); *B60W 2555/20* (2020.02); *B60W 2555/40* (2020.02); *B60W 2556/10* (2020.02); *B60W 2556/55* (2020.02); *B60Y 2200/92* (2013.01)

(58) Field of Classification Search
CPC . B60K 6/26; B60K 6/42; B60K 6/387; B60K 6/442; B60K 2006/4825; B60K 6/48; B60Y 2200/92; Y02T 10/62; Y02T 10/12; Y02T 10/40; F02N 11/0837; F02N 2200/123; F02N 2200/125; F02N 2300/2006; F02N 2200/026; Y02A 50/20
See application file for complete search history.

(56) References Cited

U.S. PATENT DOCUMENTS

| | | | |
|---|---|---|---|
| 8,214,122 | B2 | 7/2012 | Krupadanam et al. |
| 8,359,829 | B1 | 1/2013 | Ramberg |
| 9,440,654 | B2 | 9/2016 | Atluri et al. |
| 2017/0130635 | A1* | 5/2017 | Smith ................ B60K 6/24 |
| 2018/0105158 | A1* | 4/2018 | Namuduri ........... B60W 40/076 |
| 2018/0203443 | A1* | 7/2018 | Newman ................ B60L 1/00 |
| 2018/0222309 | A1* | 8/2018 | Follen .................. B60W 20/30 |
| 2019/0031199 | A1* | 1/2019 | Dudar .................. B60K 11/085 |
| 2019/0146500 | A1* | 5/2019 | Yalla .................. G01C 21/3602 |
| | | | 701/25 |
| 2019/0248359 | A1* | 8/2019 | Miller ............... B60W 50/0097 |
| 2019/0322308 | A1* | 10/2019 | Adachi ..................... B60T 8/74 |
| 2020/0201356 | A1* | 6/2020 | Schuh ..................... B60T 8/171 |
| 2020/0207218 | A1* | 7/2020 | Lavertu ..................... B61C 7/04 |
| 2020/0361444 | A1* | 11/2020 | Sujan ............... B60W 50/0097 |
| 2020/0378781 | A1* | 12/2020 | Kantarjiev ......... G01C 21/3461 |

\* cited by examiner

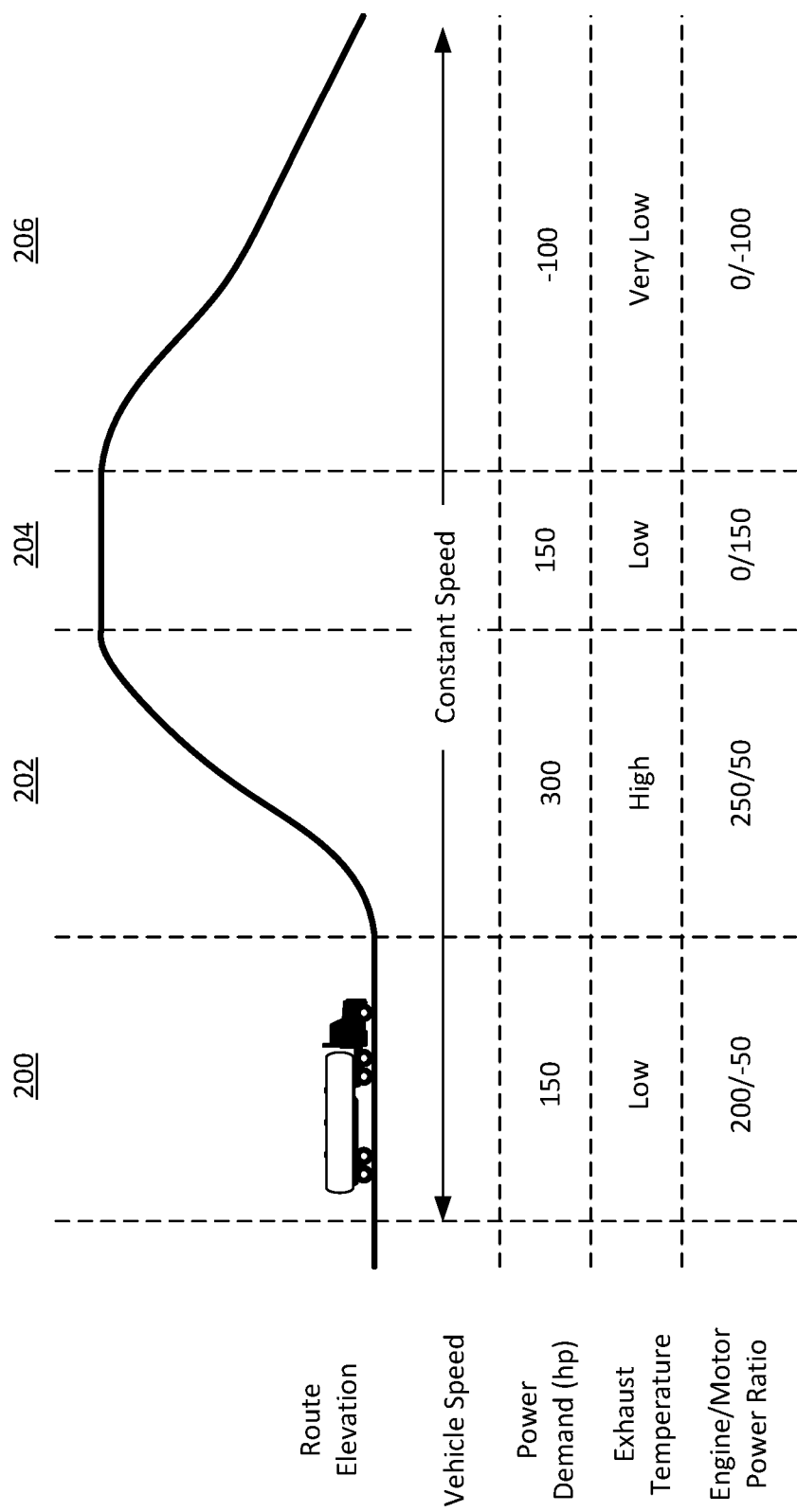

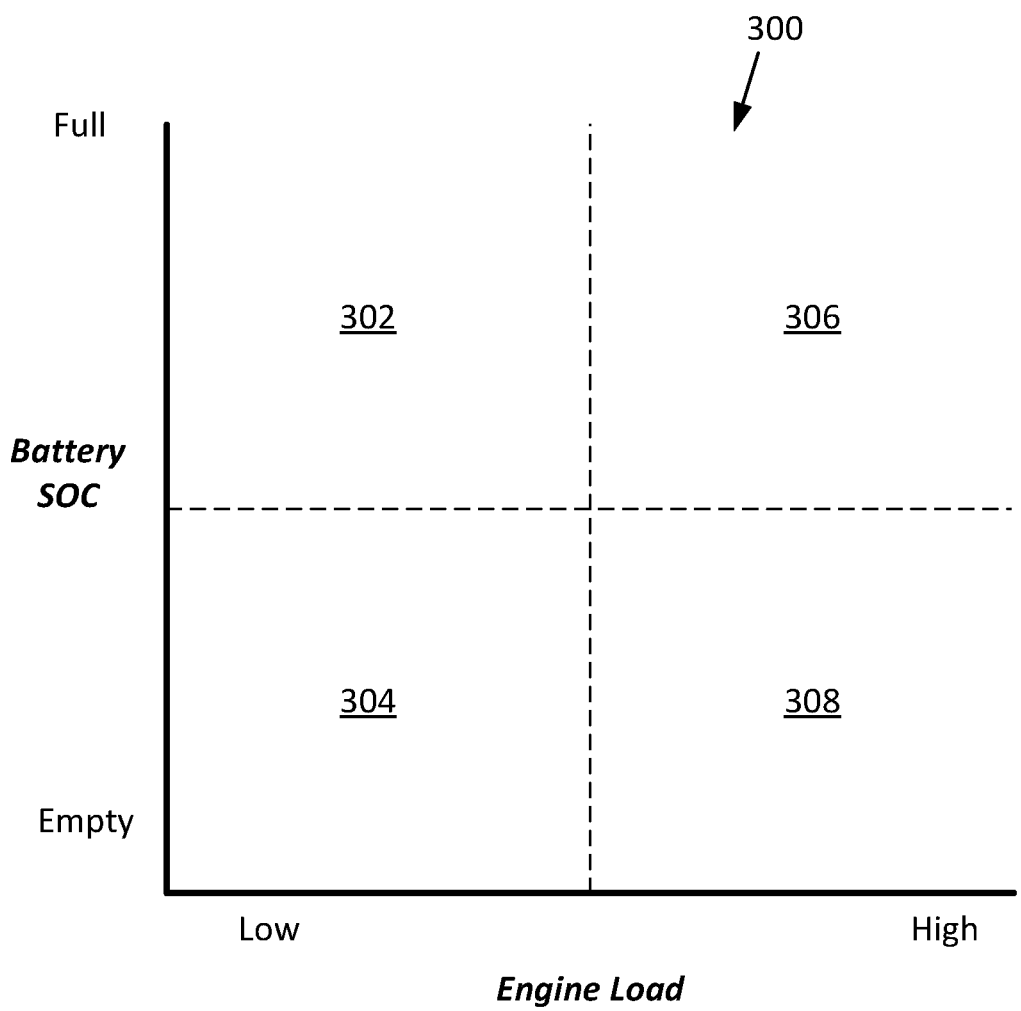

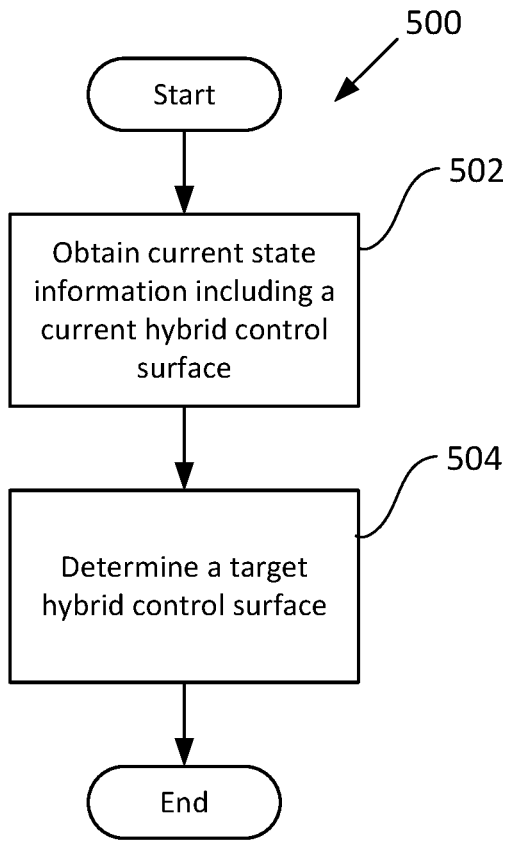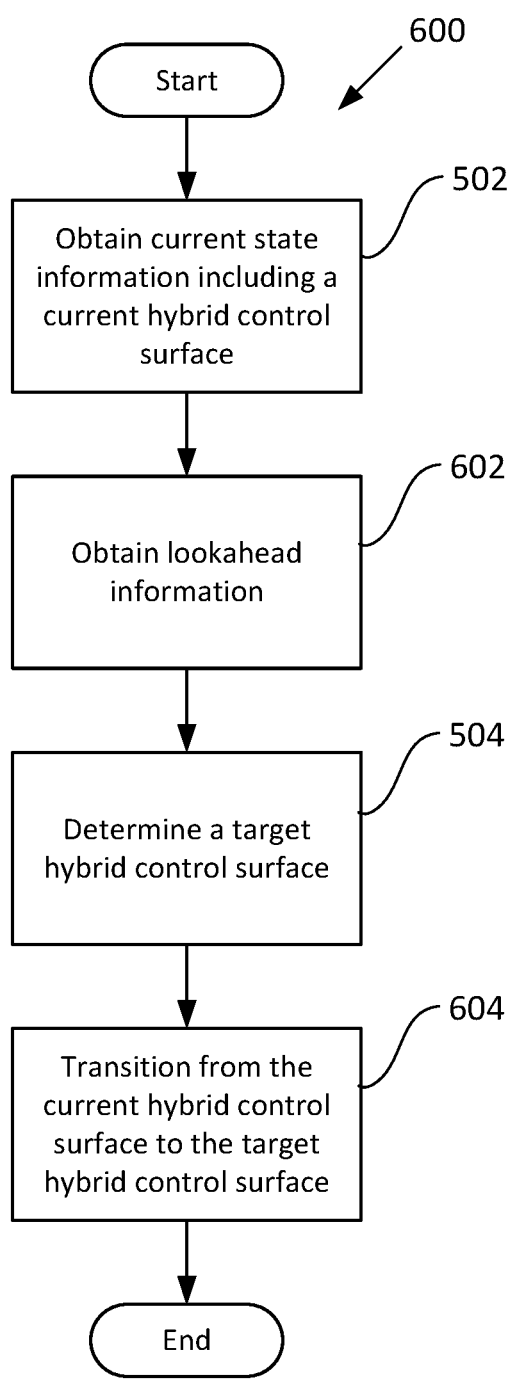

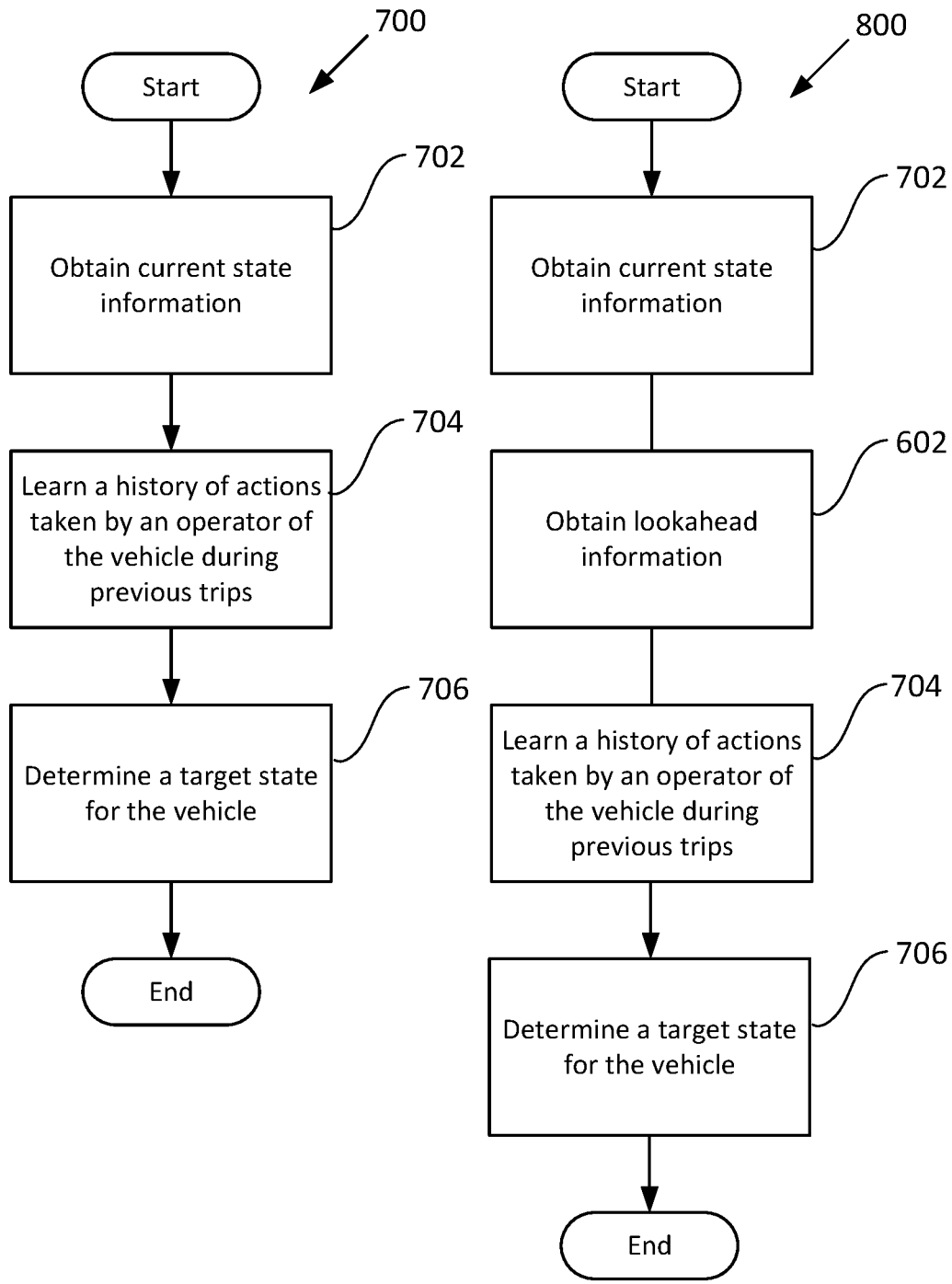

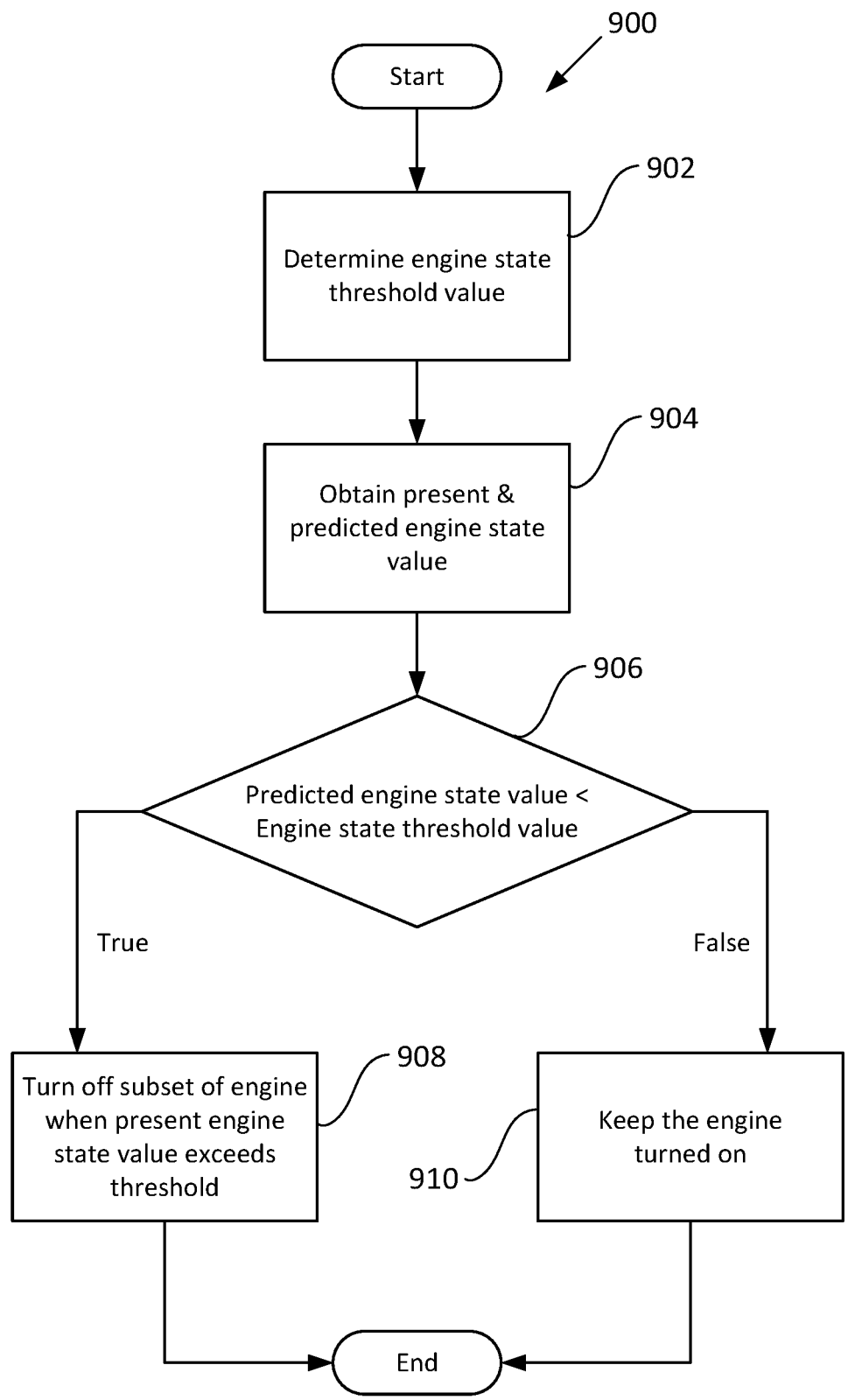

METHOD AND SYSTEM FOR A HYBRID POWER CONTROL IN A VEHICLE

CROSS-REFERENCE TO RELATED APPLICATIONS

This application claims priority to U.S. Provisional Application No. 62/846,996, filed on May 13, 2019, incorporated herein by reference in its entirety.

FIELD OF THE DISCLOSURE

The present disclosure relates generally to hybrid vehicles, especially to controlling a powertrain of the hybrid vehicles.

BACKGROUND OF THE DISCLOSURE

Recently, there has been an increased demand for vehicles with hybrid powertrains, i.e. hybrid vehicles with multiple forms of motive power, to meet criteria such as improved fuel economy and reduced emissions, all the while maintaining optimal performance for the user. When a hybrid vehicle is moving at a slow speed with a number of stop-starts (i.e., in heavy traffic), with the transmission in a forward gear, but with the driver not pressing the accelerator pedal, the vehicle slowly moves forward in a state known as creep idling. It is preferable to avoid this type of engine idling because much of the fuel that is used during this time is wasted, when it would be more efficient to use the same amount of fuel in a road with light traffic to allow the vehicle to be driven at a much faster speed.

Also, when the temperature of a catalyst used in a selective catalytic reduction (SCR) system is too low or too high, the efficiency of the SCR system drops considerably, causing more nitrogen oxides (NOx) to be released into the atmosphere as vehicle emissions before they can be reduced into diatomic nitrogen and water with the help of a catalyst, such as ammonia. Therefore, it is preferable to avoid using the engine and instead use the electric motor to drive the hybrid vehicle when the catalyst temperature is too low and when the catalyst temperature is too high.

Furthermore, turning on the engine while the hybrid vehicle is stopped on the road causes an increase in the NOx emissions from the vehicle. This is because when the engine is initially turned on, the catalyst temperature within the SCR system is not yet high enough to allow for the SCR system to operate efficiently, so the engine needs to keep running for a period of time to raise the catalyst temperature to a preferred temperature. During this process, until the catalyst temperature reaches the preferred temperature, the SCR system continues to operate but not at its optimal efficiency, thereby causing more NOx emissions to be released into the atmosphere.

In view of the above examples, there is a need to operate the hybrid powertrains in hybrid vehicles such that operation of the electric motor and the engine is controlled in a way that is as efficient as possible in terms of fuel economy and reduced emissions.

SUMMARY OF THE DISCLOSURE

Various embodiments of the present disclosure relate to methods and systems to improve fuel economy and reducing emissions of a vehicle which includes an electric motor with an energy storage device associated therewith, an engine, and a controller associated with the motor and the engine. In one embodiment, the controller obtains current state information including a current hybrid control surface and determines a target hybrid control surface for the vehicle based on the current state information. In one aspect of this embodiment, the controller transitions from the current hybrid control surface to the target hybrid control surface when the target hybrid control surface is different from the current hybrid control surface. In one embodiment, each of the current and target hybrid control surfaces is associated with at least one of: an altitude, an environmental condition, and an internal system state of the vehicle. In another embodiment, the controller obtains lookahead information such that the target hybrid control surface is determined based on the lookahead information and the current state information.

In one aspect of the embodiment, the lookahead information includes predicted driving conditions of a route taken by the vehicle. In another aspect, the lookahead information includes predicted traffic information. In yet another aspect, the lookahead information includes predicted changes in a mass of the vehicle. In one aspect, the lookahead information includes predicted operating temperatures of electronics within the vehicle. In another aspect, the lookahead information includes predicted dosing amount and timing of a catalyst used in a selective catalytic reduction (SCR) system operatively coupled to the engine. Furthermore, in one aspect, the lookahead information is provided via telematics.

Also disclosed herein are methods and systems for improving fuel economy and reducing emissions of a vehicle, which include the controller obtaining current state information, learning a history of actions taken by an operator of the vehicle during previous trips, and determining a target state for the vehicle based on the learned history and the current state information. In one aspect of the embodiment, the controller obtains lookahead information, such that the target state is determined based on the learned history, the lookahead information, and the current state information. In another embodiment, the learned history is implemented in a historically built database of road pattern expectations. In one aspect of this embodiment, the database is implemented in a processing unit accessible by the controller wirelessly from a remote location. In another aspect of this embodiment, the processing unit is a remote server in a cloud computing environment. In some embodiments, the lookahead information includes one or more of: predicted driving conditions of a route taken by the vehicle, predicted traffic information, predicted changes in a mass of the vehicle, predicted operating temperatures of electronics within the vehicle, and predicted dosing amount and timing of a catalyst used in an SCR system operatively coupled to the engine.

Further disclosed herein are vehicles which include a hybrid powertrain architecture comprising an engine and an electric motor, an energy storage device operatively coupled to the electric motor, and a controller operatively coupled to the hybrid powertrain architecture. In one embodiment, the controller obtains current state information including a current hybrid control surface and determines a target hybrid control surface for the vehicle based on the current state information. In another embodiment, the controller obtains current state information, learns a history of actions taken by an operator of the vehicle during previous trips, and determines a target state for the vehicle based on the learned history and the current state information.

Additionally disclosed herein are methods and systems for improving fuel economy of a vehicle with an electric motor, an engine, an energy storage device, and a controller, in which the controller determines a threshold value for each of at least one engine state, such that each engine state is defined by an engine state value, and obtains a present engine state value and a predicted engine state value. If the predicted engine state value exceeds the threshold value, the controller response to the present engine state value exceeding the threshold value by deactivating the engine. In one aspect of this embodiment, the at least one engine state includes engine power demand. In another aspect, the at least one engine state further includes a temperature of an SCR system operatively coupled to the engine. In another aspect, if a predicted engine power demand is below an engine power demand threshold value and a predicted temperature is below a temperature threshold value, the engine is deactivated when a present engine power demand is below the engine power demand threshold value and the present temperature is below a temperature threshold value.

In another embodiment, the at least one engine state includes an exhaust gas temperature and a rate at which the exhaust gas flows through an SCR system operatively coupled to the engine. In one aspect of this embodiment, if a predicted exhaust gas temperature is below an exhaust gas temperature threshold value and a predicted exhaust gas flow rate is above an exhaust gas flow rate threshold value, the engine is deactivated when a present exhaust gas temperature is below the exhaust gas temperature threshold value and a present exhaust gas flow rate is above the exhaust gas flow rate threshold value. In another aspect of this embodiment, if a predicted SCR temperature is below a SCR temperature threshold, the engine is deactivated when a present SCR temperature is below a SCR temperature threshold. In one embodiment, the processing unit obtains a predicted time for a present engine state value to exceed the threshold value based on the predicted engine state value and keeps the engine activated until the precited time.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

FIG. 2 is a diagram illustrating the relationship of engine/motor power ratio in different route elevations according to one embodiment;

FIG. 3 is a chart illustrating the four quadrants, each for a different combination of battery SOC and engine load;

FIG. 5 is a flow diagram of a method as disclosed herein;
FIG. 6 is a flow diagram of a method as disclosed herein;
FIG. 7 is a flow diagram of a method as disclosed herein;
FIG. 8 is a flow diagram of a method as disclosed herein;
FIG. 9 is a flow diagram of a method as disclosed herein.

Figure 1A:
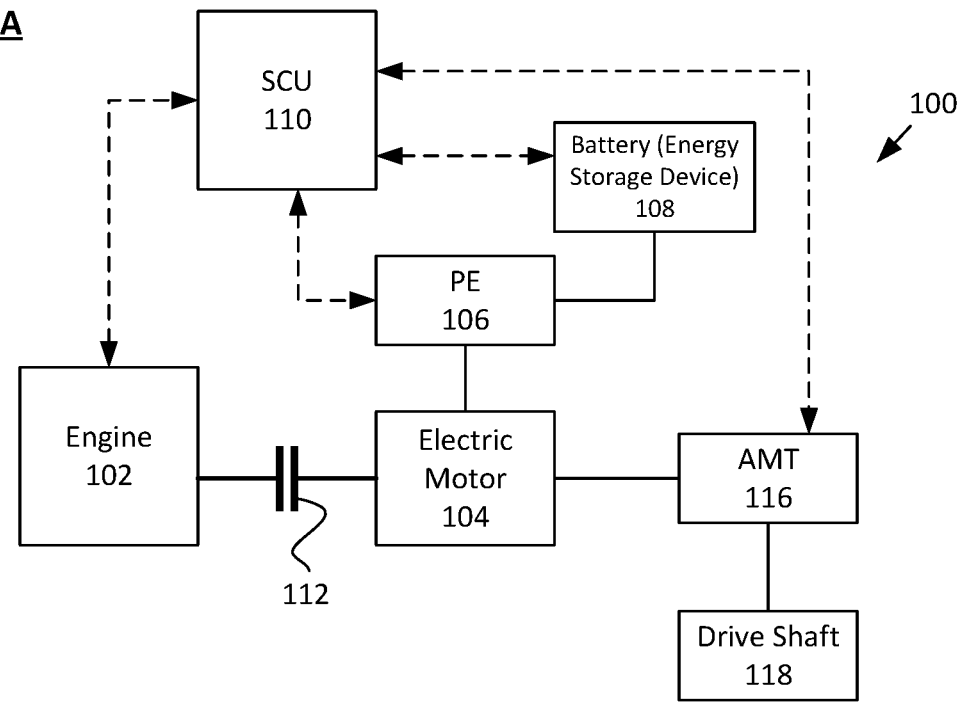
FIG. 1A is a block diagram of an example of a hybrid vehicle according to some embodiments.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

FIG. 1A shows a hybrid vehicle 100 with a hybrid architecture including an engine 102 powered by fuel such as gasoline or diesel and an electric motor/generator 104 controlled by a power electronics (PE) module 106 and powered by a battery 108. A system control unit (SCU) 110 controls the operation of the engine 102, the PE module 106, and the battery 108. A clutch 112 is located between the engine 102 and the electric motor 104, and when the clutch 112 is enabled, the engine 102 is mechanically coupled with an automated manual transmission (AMT) 116, which is also controlled by the SCU 110. Other configurations of the hybrid architecture are also applicable. In this example, the hybrid architecture becomes a parallel hybrid architecture when the clutch 112 is engaged such that the engine 102 and the motor 104 can both provide mechanical power to drive the vehicle 100. The hybrid architecture also becomes a fully electric vehicle architecture when the clutch 112 is disengaged, disconnecting the engine 102 from the motor 104, and the AMT 116 is temporarily deactivated.

Figure 1B:
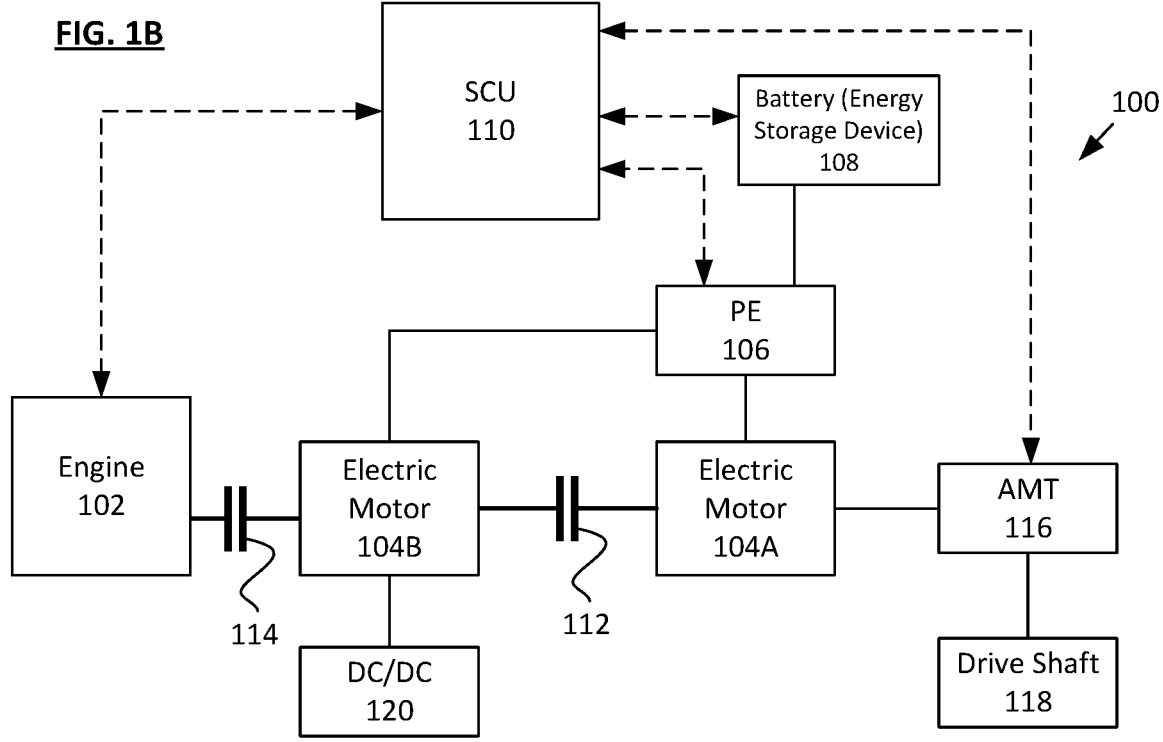
FIG. 1B is a block diagram of an example of a hybrid vehicle according to some embodiments.

FIG. 1B shows a hybrid vehicle 100 with a hybrid architecture that includes a plurality of electric motor/generators which can individually provide power as needed for the vehicle 100. Having more than one electric motor/generator not only provides more power but also allows for a faster charging of the battery or batteries. In the example shown, there are two electric motors/generators 104A and 104B, each controlled by the PE module 106. The first motor 104A is coupled with the second motor 104B by clutch 112, and the second motor 104B is coupled with the engine 102 by clutch 114. The motor 104B also includes a DC/DC converter 120. When the clutch 114 is disengaged, the vehicle 100 becomes a fully electric vehicle, and engaging the clutch 112 provides additional power because both motors 104A and 104B can drive the vehicle 100. When the clutch 114 is engaged but the clutch 112 is disengaged, the vehicle 100 becomes a series hybrid architecture where the engine 102 powers the battery using the motor 104B and the other motor 104A is providing the mechanical power to drive the vehicle 100. When both clutches 112 and 114 are engaged, the vehicle 100 becomes a parallel hybrid architecture because the engine 102 and both of the motors 104A and 104B can provide mechanical power to drive the vehicle 100.

FIG. 2 illustrates an example of how a predicted load on a hybrid vehicle affects the power demand as well as engine-to-motor power ratio. In the example shown, a processing unit associated with the vehicle is aware that the vehicle is traveling a route with varying elevation. For example, in a first portion 200 of the route, the area is considered a flatland and the path is generally free of hills and slopes. In this portion, the vehicle uses the engine to charge an energy storage device associated with the electric motor, such as a battery, while driving with a relatively low exhaust temperature because the load on the vehicle is low. As such, the power demand is also not high, and the engine-to-motor power ratio is 200/−50, i.e. 200 hp (horsepower) is used to drive the engine such that out of the 200 hp, 50 hp of power is stored in the battery. This is achieved by using the motor as a generator and converting the mechanical energy of the engine into electrical energy to be stored in the battery. Therefore, the total power demand of 150 hp is met.

In a second portion 202 of the route, the vehicle is facing an inclination which increases the predicted load on the engine and motor, but the speed of the vehicle is to stay the same as in the first portion 200. As such, the power demand is increased to 300 hp, of which the engine-to-motor power ratio is 250/50, such that both the engine and the motor are contributing to the power demand. Because the load on the engine is increased, the exhaust temperature is high to accommodate for the temperature increase necessary for the aftertreatment system of the engine to operate efficiently. In some examples, the aftertreatment system includes, but are not limited to, SCR with diesel oxidation catalyst, three-way catalytic converters, dual-bed converters, and any other types of aftertreatment components known in the art.

In a third portion 204 of the route, the situation is like that of the first portion 200 in that the vehicle is again on a flatland, and the vehicle's power demand is decreased to the same level and so is the exhaust temperature. However, the engine-to-motor power ratio is now 0/150, meaning that all of the power demand (150 hp) is accommodated by the motor alone, without the assistance from the engine. This is because the processing unit understands that the vehicle is approaching a downhill slope, so as a result, there is no need for the vehicle to further charge the battery, nor is there a need for the vehicle to operate the engine when the battery is sufficiently charged. Using the motor instead of the engine decreases the exhaust emitted by the vehicle.

In a fourth portion 206 of the route, the vehicle is now on a downhill slope as predicted by the processing unit. The downhill slope allows for negative power demand of −100 hp, which means that the engine can be turned off and the motor now acts as a generator in that the mechanical energy obtained by the vehicle as it drives down the slope is converted into electrical energy to be stored in the battery, thereby achieving not only minimal exhaust but also allowing for the battery to be charged without activating the engine. In this portion, the exhaust temperature is thus very low, and the engine-to-motor power ratio is 0/−100.

The aforementioned load prediction in FIG. 2 may be achieved using any predictive control algorithm as incorporated in a vehicle system known in the arts, such as by integrating a third party digital map data and vehicle sensor data such as camera and GPS data, as well as other cloud-based system algorithm. In some examples, the digital map data includes elevation data, such that the processing unit is aware of all slopes within a certain distance from the current location of the vehicle. When the vehicle approaches an uphill slope as indicated by the map data, the processing unit then looks for all downhill slopes within the vicinity and checks the data with the predicted route that the vehicle is taking. For example, if the vehicle is traveling a route in which the vehicle first encounters an uphill slope followed by a downhill slope, as shown in FIG. 2, the processing unit can determine the power demand and engine-to-motor power ratio as explained above. In another example, if the route first takes the vehicle to the downhill slope and then to the uphill slope, the processing unit understands that the battery can be charged during the vehicle's trip downhill, and then the energy from the battery can be used to operate the motor to assist the engine when the vehicle is driving uphill. In yet another example, there may be a plurality of uphill and downhill slopes in the route; in such case, the processing unit takes into consideration the power demand needed for each individual slope, and then determines the scheduled engine-to-motor power ratios to apply to the vehicle during the drive.

It is understood that other data besides the elevation can be used to predict future load. In one example, the processing unit uses traffic data to determine when the vehicle speed is to be decreased, resulting in disabling the engine to reduce emission. In another example, the processing unit uses terrain data to determine if the vehicle will drive through a terrain which requires additional power, such as through a muddy forest path or a sandy desert path. It is also understood that the processing unit can use a combination of more than one type of data to predict the future load applied to the vehicle and then to determine the engine-to-motor power ratio to accommodate it.

FIG. 3 shows a power split table 300 which is used by the processing unit to determine the power ratio in one embodiment. The power split table 300 is divided into four quadrants. The first quadrant 302 is defined as when there is low engine load and high battery state of charge (SOC). The second quadrant 304 is defined as when there is low engine load and low battery SOC. The third quadrant 306 is defined as when there is high engine load and high battery SOC. The fourth quadrant 308 is defined as when there is high engine load and low battery SOC.

In the first quadrant 302, the processing unit would determine that if the motor can handle all of the predicted load, the engine is turned off. Otherwise, the motor can apply additional load to the engine to improve emissions at the potential expense of fuel economy as the battery is already charged. In the second quadrant 304, the motor can apply additional load to the engine to increase the exhaust temperatures and also charge the battery. In the third quadrant 306, the motor can be used in order to reduce the load, if the future loading does not require the need to use the battery. And finally, in the fourth quadrant 308, the motor cannot assist in accommodating the future load and the engine does not have excess power available for charging.

Figure 4:
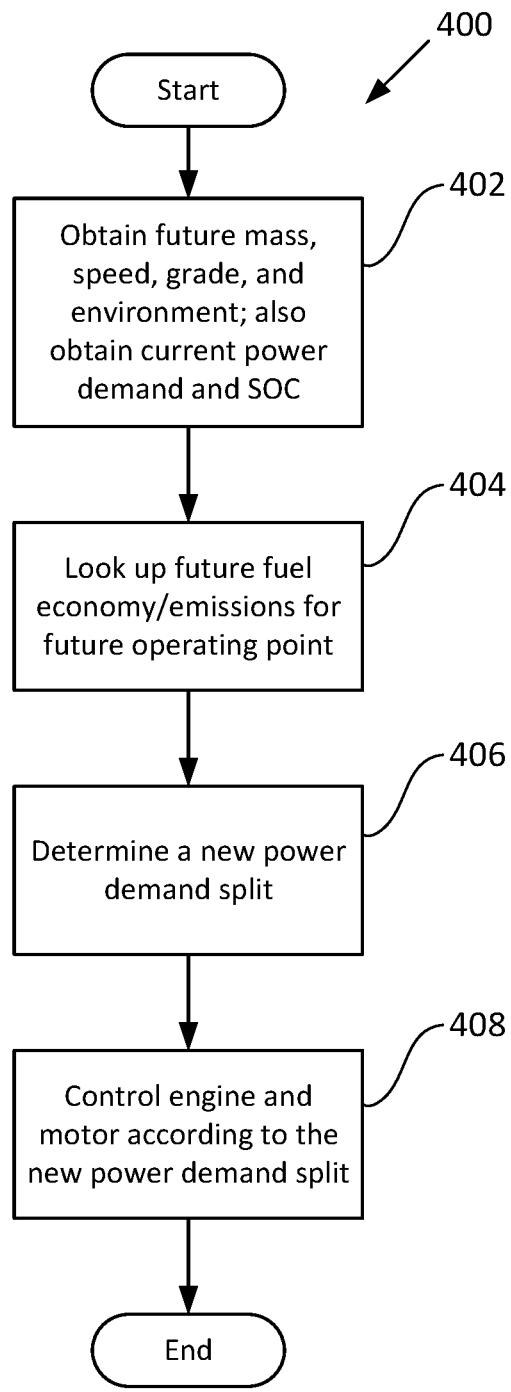
FIG. 4 is a flow diagram of a method as disclosed herein.

FIG. 4 shows a method 400 used by the processing unit in one embodiment to determine the power split as shown above. In the first step 402, the processing unit obtains the future mass and speed of the vehicle and grade of the road, as well as environmental condition such as weather and/or air densities. Additionally, the processing unit also obtains the current power demand and SOC of the battery. In step 404, the processing unit looks up the future fuel economy/emissions for a future operating point. In step 406, the processing unit determines a new power demand split between the engine and the motor/generator. During this step, the processing unit determines if the battery needs to be charged, and if the load on the engine needs to be increased to accommodate the future load. In step 408, the engine and the motor are controlled according to the new power demand split. In some examples, the determination of power split is impacted by the current SOC, as well as proactive planning of what future SOC may be needed. Therefore, the processing unit uses the power split table 300 in FIG. 3 in step 406 to decide if the current SOC is sufficient to meet the predicted power demand.

FIG. 5 shows a method 500 according to an embodiment as disclosed herein. In the first step 502, the current state information is obtained, which includes a current hybrid control surface. Then, in the following step 504, a target hybrid control surface is determined based on the current hybrid control surface and other current state information. Each hybrid control surface represents a lookup table with operating conditions for the hybrid vehicle, where different control surfaces are used in different circumstances to accommodate for the different situations faced by the hybrid vehicle. For example, a steady state operating condition is described in an alpha-1 control surface, while a transient operating condition is described in an alpha-0 control surface. In some examples, the alpha-0 and alpha-1 are operating conditions used at sea level, or at an altitude close to sea level. Other steady and transient operating conditions at high altitude are then represented by other control surfaces, also known as chi-level control surfaces. There are numerous different chi-level surfaces, named chi-1, chi-2, chi-3, etc., to distinguish from the operating conditions of the alpha control surfaces. In some examples, the different chi-level control surfaces represent different altitudes, environmental conditions such as air densities, or internal mixing states such as the mixing factors of the air inside the engine. In some examples, the altitude may cause the engine to reduce power output or availability due to an altitude-related de-rate condition. For example, as altitude increases, the air becomes less dense and contains less oxygen for the engine to take in, which results in less efficient combustion and less efficient heat transfer. As the elevation (altitude) increases, the amount of de-rating also increases in the engine that is placed in such environment. In some examples, each of the alpha and chi-level control surfaces is sorted into different modes, such as a selective catalytic reduction (SCR) thermal management mode to manage the temperature of the SCR system of the vehicle or a de-soot mode which removes particulate matter by oxidization. The operating conditions in the alpha control surfaces therefore have better fuel economy than those in the chi-level control surfaces. Other suitable modes can also be implemented as appropriate for the vehicle.

FIG. 6 shows another method 600 as used in an embodiment in which a first step 602 of obtaining lookahead information and a second step 604 of transitioning from the current hybrid control surface to the target hybrid control surface are implemented in the method 500 of FIG. 5. In one example, the step 504 involves determining a target hybrid control surface based on the current state information and the lookahead information. Specifically, the step 604 is applicable when the target hybrid control surface is different from the current hybrid control surface; if the current and the target hybrid control surfaces are the same, this step is skipped altogether.

Examples of lookahead information include data provided by an intelligent predictive software application such as an eHorizon (electronic Horizon) module, which provides information based on the current vehicle location relating to possible road patterns, speed restrictions, driving conditions, etc., which may affect the speed at which the vehicle is able to travel at a certain time window (e.g. in the next t seconds in time or d meters in distance) in the future. In one example, the eHorizon module accesses an external server, which is a part of a cloud-based system, to acquire the necessary information for the module to determine the road information to calculate predictions therefrom. In one example, the data received by the eHorizon module include ADAS (Advanced Driver Assistance System) map or other suitable maps as known in the art. There are also other examples of electronics features that utilize lookahead information such as SmartTorque2, SmartCoast and Predictive Cruise Control, all of which are in the ADEPT™ (Advanced Dynamic Efficient Powertrain Technology) suite for Cummins X15™ Efficiency Series engines that are designed and manufactured by Cummins.

Additionally, the predictive software application can also be integrated with vehicle-to-vehicle (V2V), vehicle-to-infrastructure (V2I), or other vehicle-to-everything (V2X) communication modules for additional benefits. For example, V2X modules enable a vehicle to transmit local dynamic map (LDM) data which includes location information of the vehicle along with other information in a layered configuration. For example, the first layer of a LDM (Type 1 data) contains the permanent static data such as map data, the second layer (Type 2) contains transient static data such as roadside infrastructure including but not limited to plug-in charging stations for charging electric-powered vehicles on the road, the third layer (Type 3) contains the transient dynamic data such as congestion and signal phase, and the fourth layer (Type 4) contains the highly dynamic data such as location, direction, and speed of other vehicles and/or pedestrians. Using such V2X modules allows for the software application to better predict the future state of the vehicle based on the lookahead information.

FIG. 7 shows a method 700 as used in an embodiment in which a history of actions is involved in determining a target state. In the first step 702, current state information is obtained. Then, in the second step 704, the history of actions taken by an operator of the vehicle during previous trips is learned by a processing unit associated with the vehicle via machine intelligence. For example, the processing unit may learn about the routes taken by the vehicle during a past time frame of predetermined length, the driving style of the operator, the time of day in which previous trips were made, etc. In one example, the driving style may include the speed at which the operator drives the vehicle in view of the speed limit of a certain area, as well as whether the operator prefers certain roads over others when making these trips.

In one example, the history of actions taken by the operator may include one or more operator behaviors, among which may be whether the operator turns off the engine at stops or leaves the engine idling for extended periods of time. According to some embodiments, electrical accessory loads present in the vehicle are determined in order to calculate the predicted load for the vehicle. The predicted load is then used in making a decision regarding whether a long idling time is allowed or the engine should be at least partially turned off. The accessory loads of when the vehicle is stationary and/or when the vehicle is moving may be used in making the decision. In some examples, the accessory loads may pertain to, but are not limited to, air-conditioning compressors, cooling fans, electrically-driven hydraulic pumps, electrically-driven power steering system, etc. Depending on the amount of accessory loads that is being predicted, the engine may be kept idling in order to charge the battery when the expected or predicted accessory load exceeds a threshold value. The amount of accessory loads may vary depending upon numerous factors, including but not limited to the operator's behavior during the trip, the application of the vehicle such as the distance traveled during each trip as well as the terrain in which the vehicle travels, and the duty cycle such as the frequency of the vehicle being in operation or lack thereof, among others.

In some examples, the SCU (or any suitable computing device operatively coupled thereto) with capable processing powers may be able to learn, using any suitable machine learning techniques, a pattern of the electrical accessory loads that are applied during the vehicle's operation. The learned accessory loads may be stored and sorted by a plurality of categories such as by operator, application, duty cycle, and so on. The SCU may be able to predict the amount of electrical accessory loads that may be applied during the next trip of the vehicle based on the learned patterns of past accessory loads. For example, when an operator who is known to turn on the vehicle's air-conditioning system at full power during the vehicle trip is identified as the current operator of the vehicle, the SCU may determine that the predicted accessory load will likely increase due to the operator's aggressive use of the air-conditioning system.

In one example, the data to be learned by the processing unit is stored in a cloud-based data storage network which can be accessed wirelessly by the processing unit via Internet or other suitable means of telecommunication. For example, the data such as the lookahead information is accessible via telematics such as a navigation system installed in the vehicle which accesses the cloud-based data storage network as needed to download the information. In another example, the data can be stored in a memory unit internal to the vehicle or physically attached thereto, where the memory unit is associated with the processing unit. Subsequently, in step 706, a target state for the vehicle is determined using the current state information and the learned history of actions.

In FIG. 8, a method 800 as used in an embodiment is shown where the method 700 is changed to further include the step 602 of obtaining lookahead information, and the step 706 involves determining the target state for the vehicle based on the obtained lookahead information in addition to the current state information and the learned history. As the processing unit learns new data, the processing unit dynamically updates its decisions based on new inputs. For example, if the operator is known to drive at a speed which is 5 mph below the speed limit in a certain area (i.e. engine load is low), the processing unit can learn this and determine that the aftertreatment system needs to be warmed up before the vehicle enters the area because the speed at which the vehicle is driven in the area is too slow to effectively increase the temperature within the system and decrease the NOx emission. Alternatively, the processing unit can decide to shut down the engine entirely and switch to the electric motor to meet the power demand, if the processing unit determines that there is sufficient SOC in the battery. Such decision-making by the processing unit is based on the various data learned with regard to the state of each component within the vehicle, such as SOC of the battery, temperature of the aftertreatment system, engine capacity, etc., as well as other factors such as the aforesaid learned history of operator's actions and/or electrical accessory loads, to better accommodate the needs of the situation.

FIG. 9 illustrates a method 900 in one embodiment to determine whether to deactivate the engine based on certain parameters. For example, in step 902, the engine power demand threshold value is determined based on factors such as driving conditions, size and capacity of the vehicle, as well as the capacity and SOC of the battery associated with the electric motor. In step 904, a present engine state value is obtained using sensors, and a predicted engine state value is obtained using, for example, lookahead information, learned history from previous routes, lookup table, etc. In step 906, the processing unit determines if the predicted engine state value is less than the engine state threshold value. If so, in step 908, the engine is at least partially deactivated or turned off when the present engine state value reaches the engine state threshold value and the vehicle is driven using the electric motor.

For example, the processing unit may determine that a subset of the engine (for example, one or more of the cylinders in the engine) needs to be deactivated when the present engine state value reaches the engine state threshold value in response to the determination of step 906, because the amount of engine state value that exceeds the engine state threshold value may be small. Instead of turning off the engine, deactivating the subset of the engine may be sufficient in lowering the engine state value to below the threshold, thus enabling finer adjustment of the engine state value. In such scenarios, the engine remains turned off, but the subset is deactivated, in step 908. Deactivating the subset of the engine may be more preferable than turning off the engine in some examples because reactivating the subset takes less time and energy than reactivating the entire engine after deactivation. Otherwise, in step 910, the engine is kept turned on to continue powering the vehicle. In one example, the engine state is the engine power demand. In some examples, as an alternative or in addition to the aforementioned step 908, the method may include activating one or more of the electric motors to change the present engine state value, such as removing some of the engine load, in order for the present engine state value to remain below the engine state threshold value.

Figure 10:
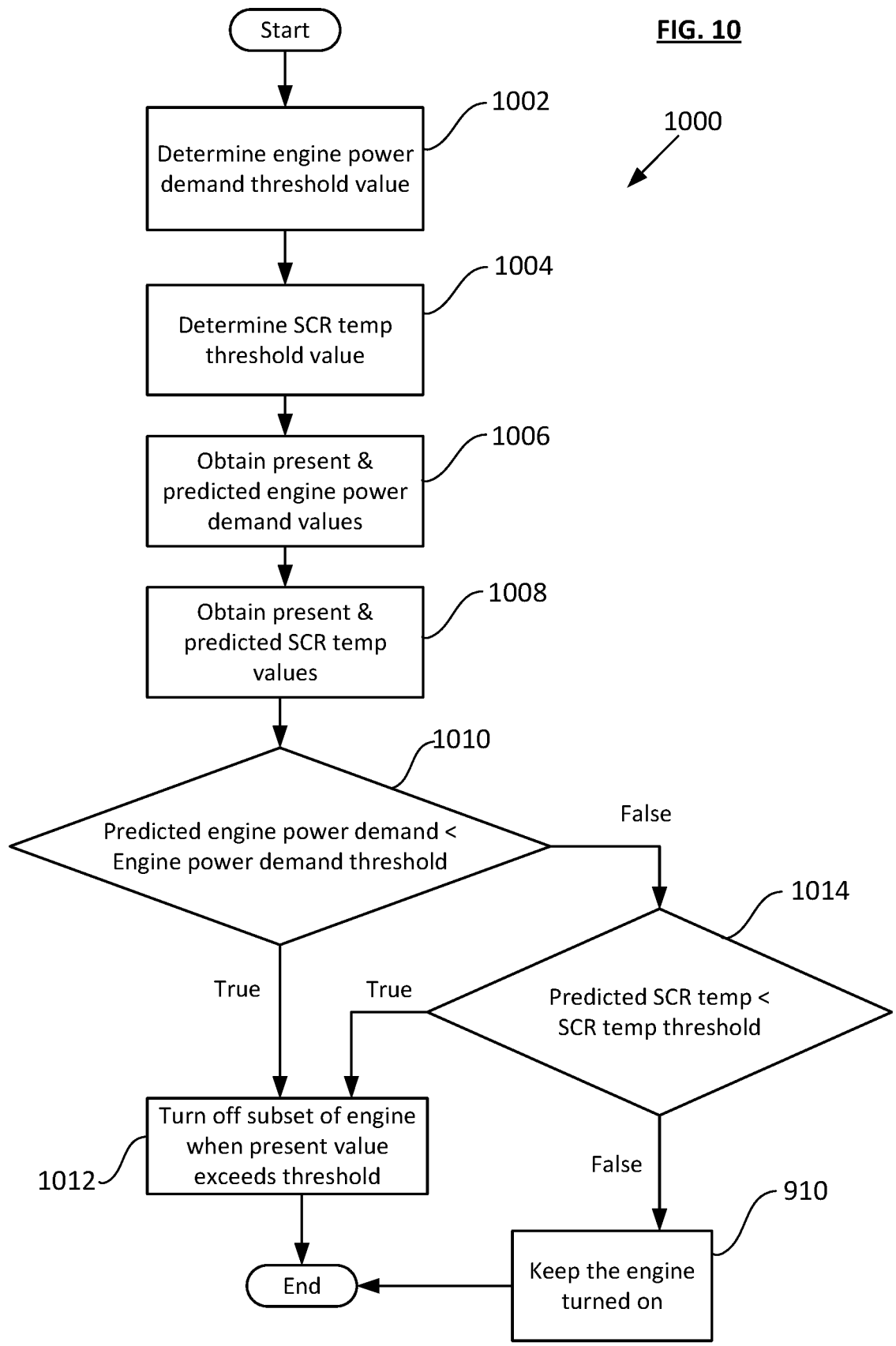
FIG. 10 is a flow diagram of a method as disclosed herein.

FIG. 10 illustrates a method 1000 in one embodiment in which an additional threshold value is introduced, which is the SCR temperature threshold value. In step 1002, the engine power demand threshold value is determined, and in step 1004, the SCR temperature threshold value is determined, which for example can be based on the minimum temperature necessary for the SCR system to function efficiently. Then, in step 1006, the present and predicted engine power demand values are obtained, based on for example the location, terrain, traffic, road condition, etc. In step 1008, the present and predicted SCR temperatures are obtained, based on for example the speed at which the vehicle is moving, the amount of power exerted by the engine, the atmospheric temperature, etc. Subsequently, if the predicted engine power demand is determined to be below the threshold in step 1010, at least a subset of the engine, for example one or more of the cylinders thereof, is turned off in step 1012 when the present value exceeds the threshold value, i.e. when the present engine power demand reaches above the engine power demand threshold value. In some examples, as an alternative or in addition to the aforementioned step 1012, the method may include activating one or more of the electric motors to change the present value in order for the present value to remain below the threshold value. Otherwise, the processing unit proceeds to step 1014 to determine if the predicted SCR temperature is below the SCR temperature threshold. If so, the engine is turned off in step 1014 when the present SCR temperature exceeds the threshold, i.e. the present SCR temperature reaches below the SCR temperature threshold. In this example, the definition of "exceeds threshold" in step 1012 differs between when the present value refers to the present engine power demand and when it refers to the present SCR temperature. In the case of the engine power demand, the threshold is an upper threshold, while in the case of the SCR temperature, the threshold is a lower threshold.

If both of the steps 1010 and 1014 result in a false statement, the processing unit proceeds to step 910, where the engine is kept on. One reason for keeping the engine turned on is to ensure that the SCR temperature is eventually increased, since if there is an increase in the engine load and the SCR temperature is not sufficiently increased, the NOx emission cannot be reduced. As such, in the example shown in FIG. 10, both the predicted engine power demand and the predicted SCR temperature needs to be below the respective threshold value to turn off the engine. In some examples, other parameters can be included in addition to the engine power demand and the SCR temperature, or one or more of the other parameters can replace one or both of these parameters.

Many additional parameters are to be considered in determining whether to change the power split between the engine and the motor. For example, a change in mass can affect the power demand in certain commercial vehicles such as trucks and buses, so the processing unit may decide to turn off the engine if the vehicle is empty (e.g. only the operator is in the vehicle with little or no other additional cargo on the vehicle or passengers in the vehicle) because the electric motor can manage the power demand. In another example, certain weather conditions such as snow or certain driving conditions such as muddy roads can increase the power demand, so in these conditions the processing unit may decide to keep the engine turned on to keep the SCR temperature high or to charge up the battery in case more power is needed down the road. In one example, temperature of the electronics within the vehicle is also considered because if the engine is kept running the temperature inside the vehicle may get hot enough to cause overheating of the electronics. In one example, the amount and timing of chemical dosing in the SCR system is considered. Because the SCR system works by dosing the precise amount of urea to activate SCR reactions with NOx in the emissions and mixing urea and ammonia thoroughly with the exhaust gas, it is important to consider the conditions that would maximize NOx conversion. Therefore, if the information obtained by the processing unit indicates that the rate of urea dosing is decreased for whatever reason, resulting in a decrease in SCR efficiency, the processing unit may decide to keep the engine on to warm up the SCR system. If the rate of urea dosing does not improve despite the increased temperature or if the temperature fails to increase, the processing unit may then decide to turn off the engine and rely on the electric motor to meet the power demand. Other suitable factors, parameters, and conditions can be applied as known in the art.

Figure 11:
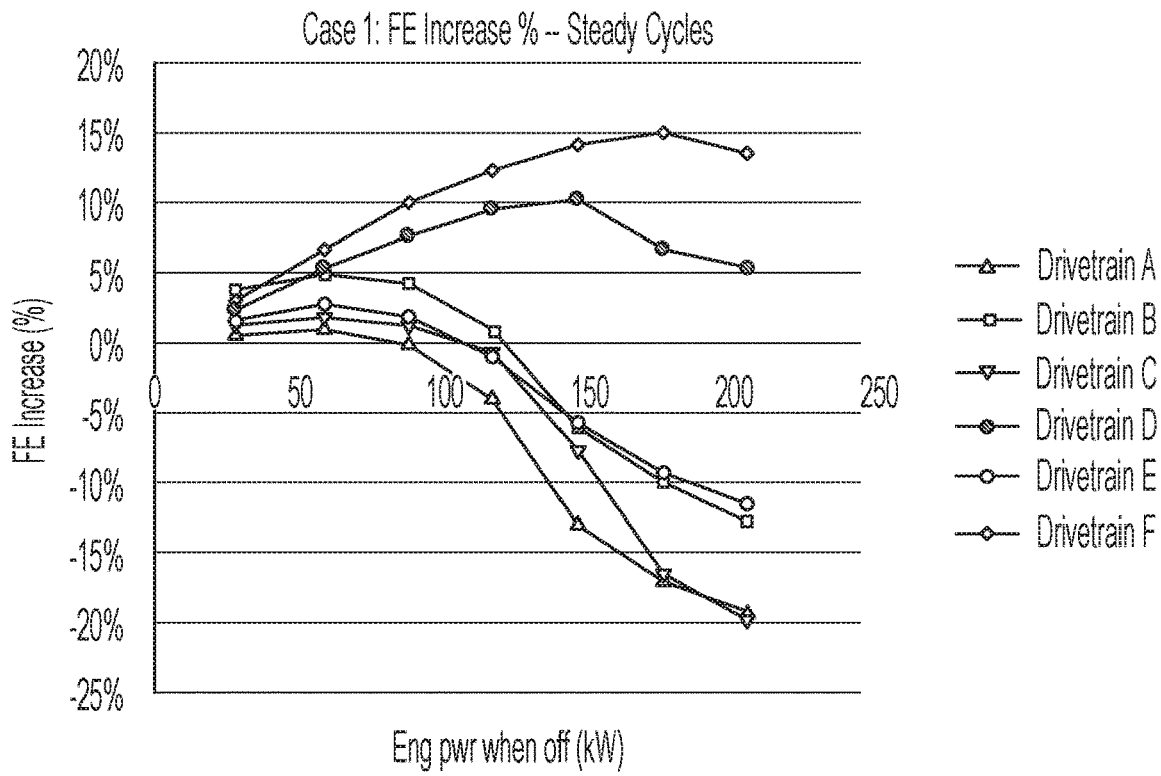
FIG. 11 is a graph illustrating the relationship between engine power demand and fuel economy increase in static cycles.
Figure 12:
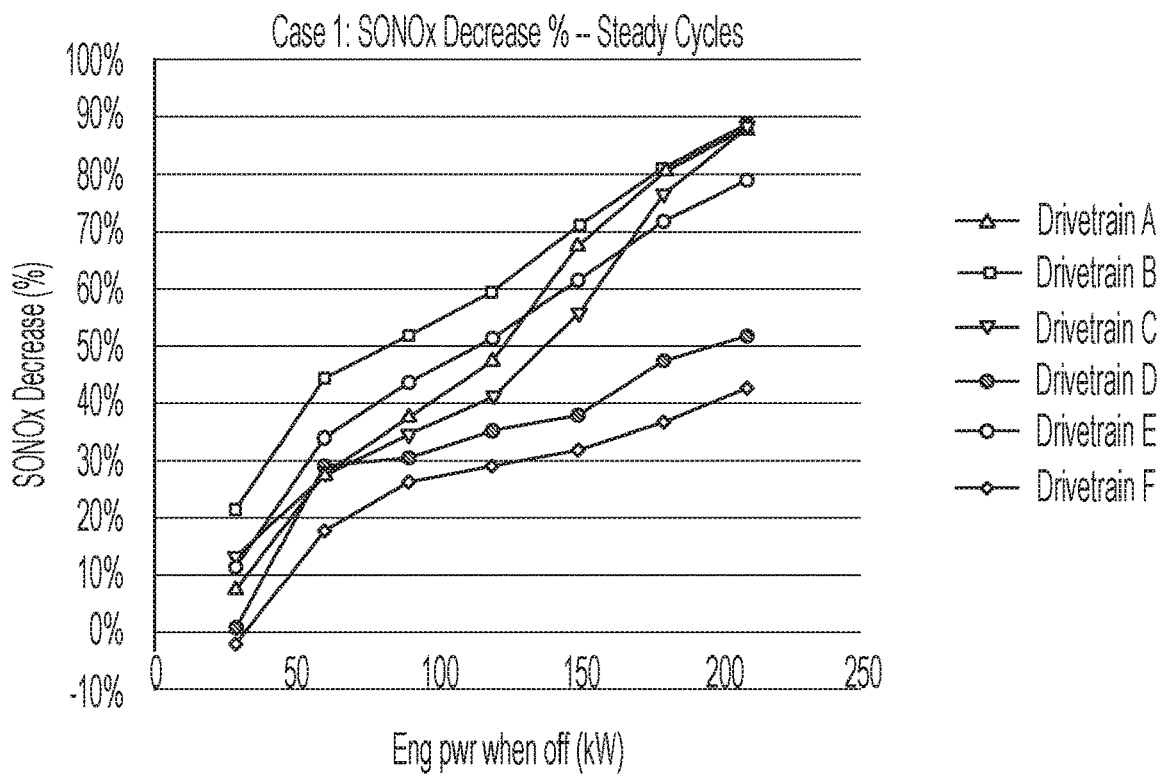
FIG. 12 is a graph illustrating the relationship between engine power demand and SONOx decrease in static cycles.
Figure 13:
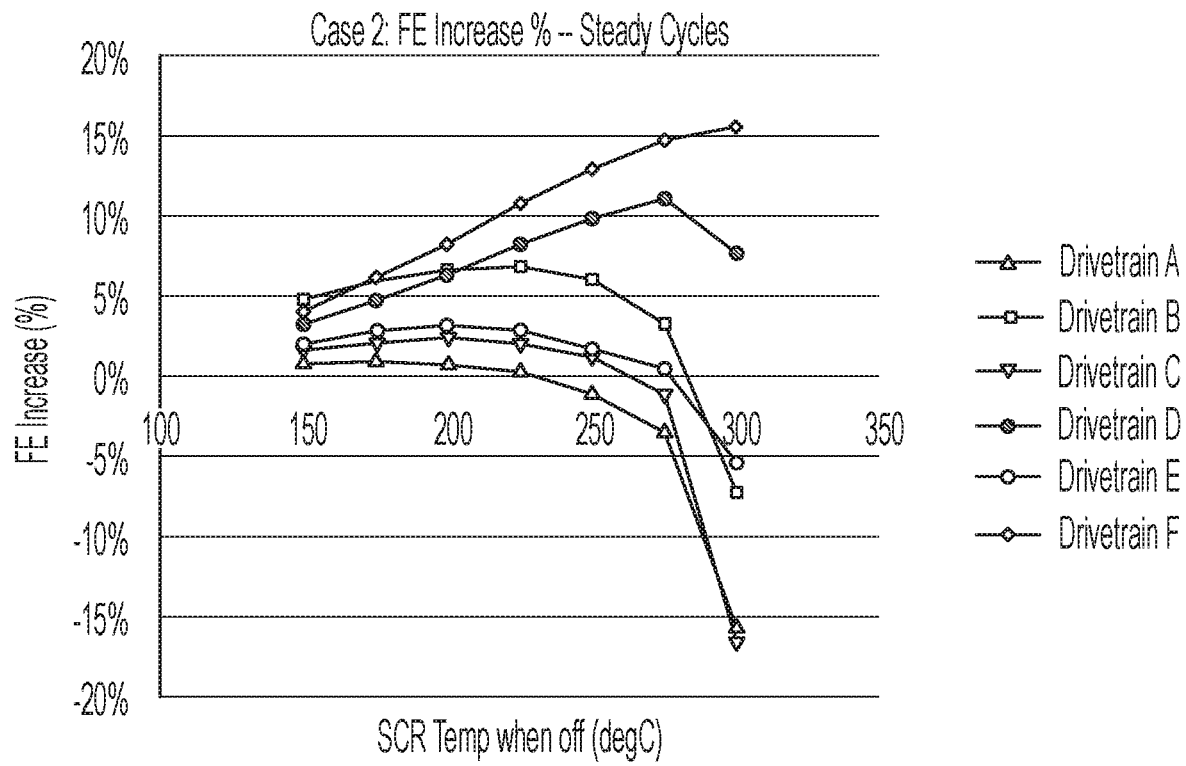
FIG. 13 is a graph illustrating the relationship between SCR temperature and fuel economy increase in static cycles.
Figure 14:
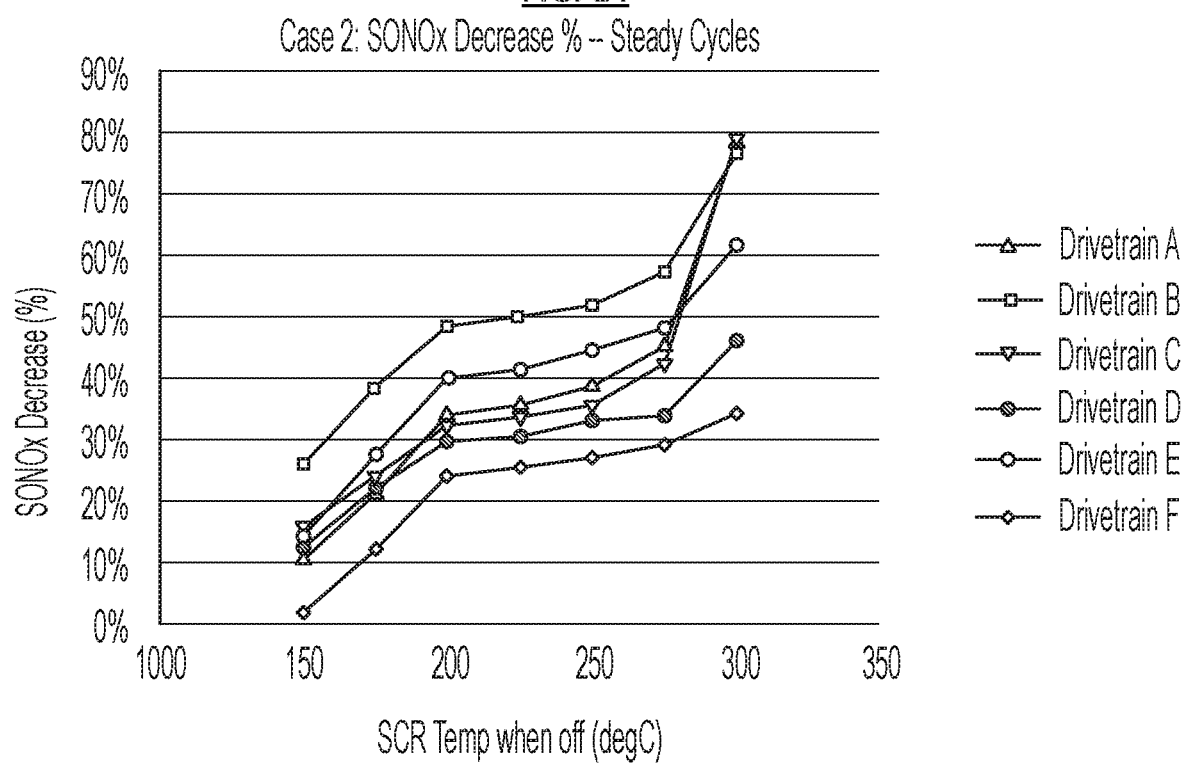
FIG. 14 is a graph illustrating the relationship between SCR temperature and SONOx decrease in static cycles.
Figure 15:
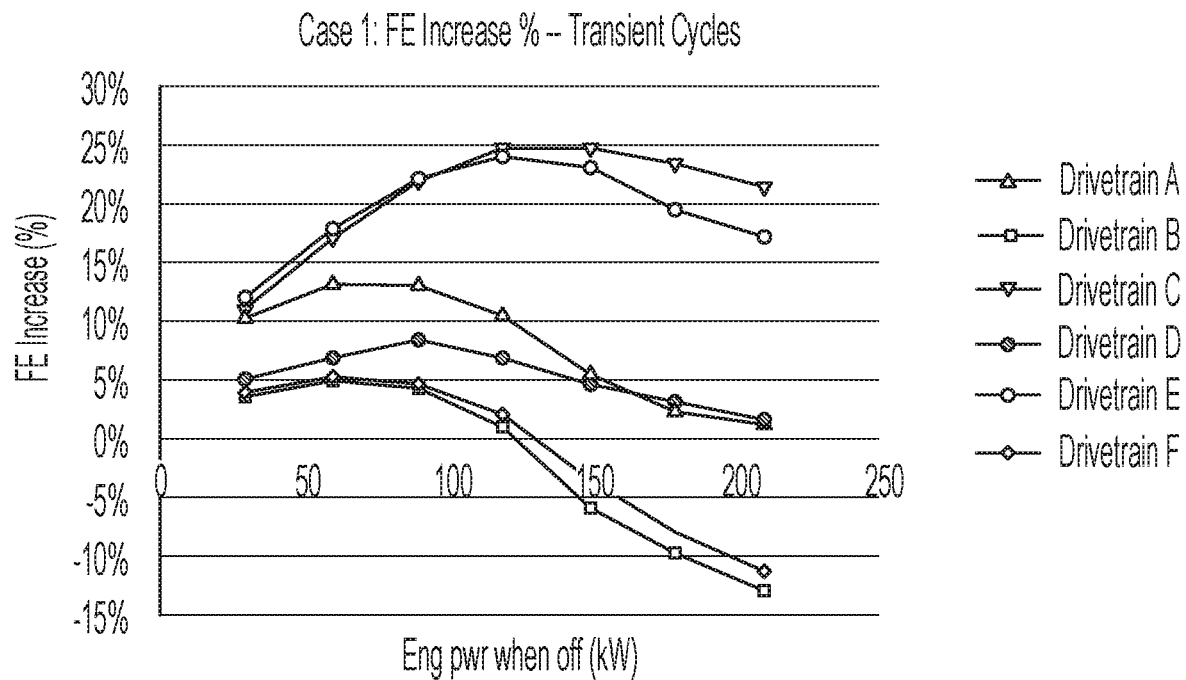
FIG. 15 is a graph illustrating the relationship between engine power demand and fuel economy increase in transient cycles.
Figure 16:
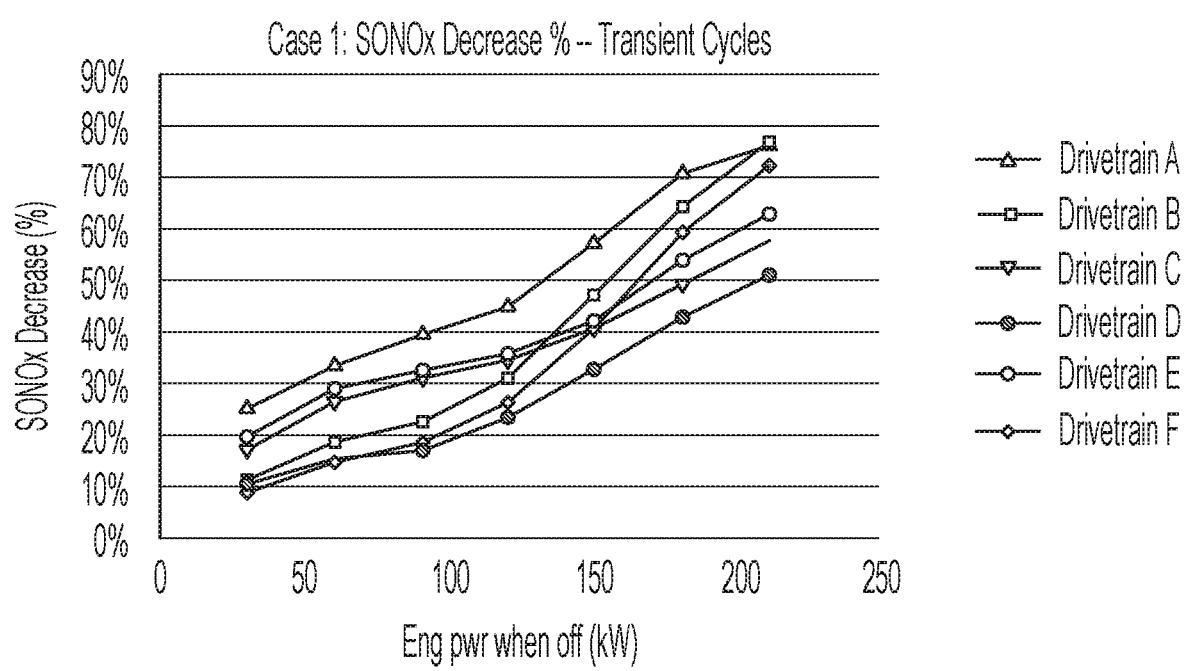
FIG. 16 is a graph illustrating the relationship between engine power demand and SONOx decrease in transient cycles.

FIGS. 11-18 illustrate graphs depicting the relationship among engine power, fuel economy (FE), system-output (SO) NOx emission, and SCR temperature in either steady or transient cycles, for six types of hybrid drivetrains, each manufactured for a different company. FIGS. 11-14 pertain to the drivetrains in steady cycles, and FIGS. 15-18 pertain to those in transient cycles. FIGS. 11 and 15 illustrate the respective FE increase (in percentage) for each drivetrain in different power demand cutoffs. For example, in FIG. 11, when the power cutoff is at approximately 30 kW, the FE increase is between 0% and 5% for all drivetrains assessed, wherein if the power cutoff is at approximately 200 kW, the FE increase can vary from −20% (i.e. decrease in fuel economy) to almost 15% in the same drivetrains. FIGS. 12 and 16 illustrate the SONOx decrease in response to the power demand cutoffs in FIGS. 11 and 15, respectively. The general trend in FIGS. 12 and 16 supports the fact that when there is more power, there is greater decrease in the SONOx, in some cases almost reaching 90% SONOx decrease at 200 kW power.

Figure 17:
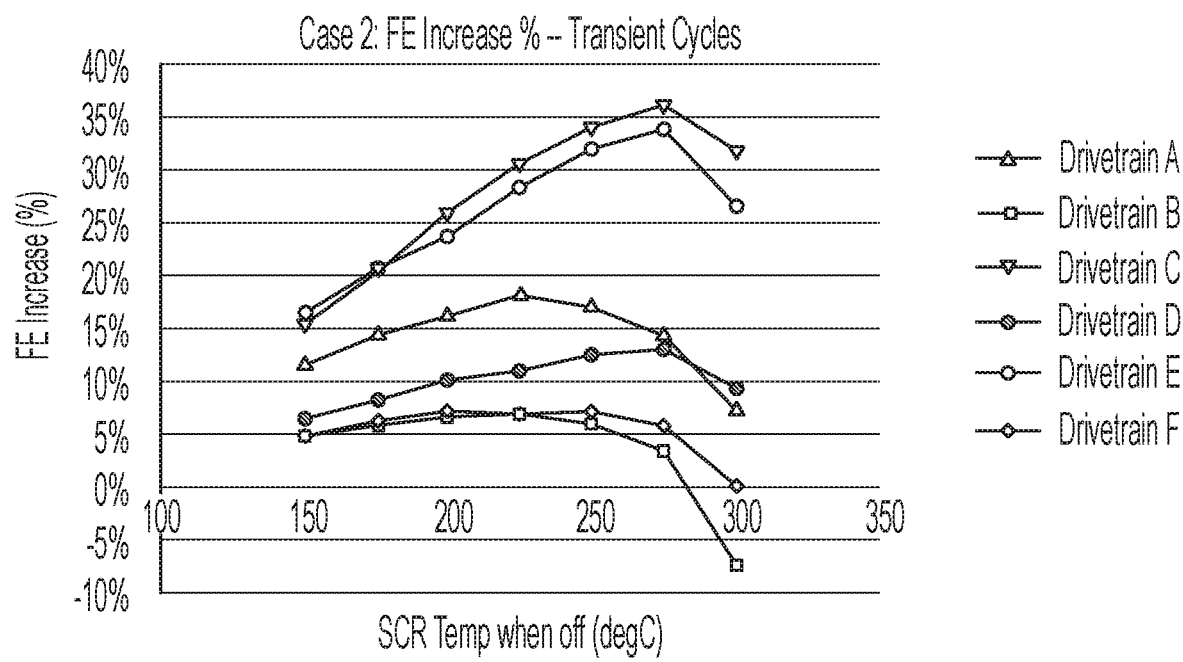
FIG. 17 is a graph illustrating the relationship between SCR temperature and fuel economy increase in transient cycles.
Figure 18:
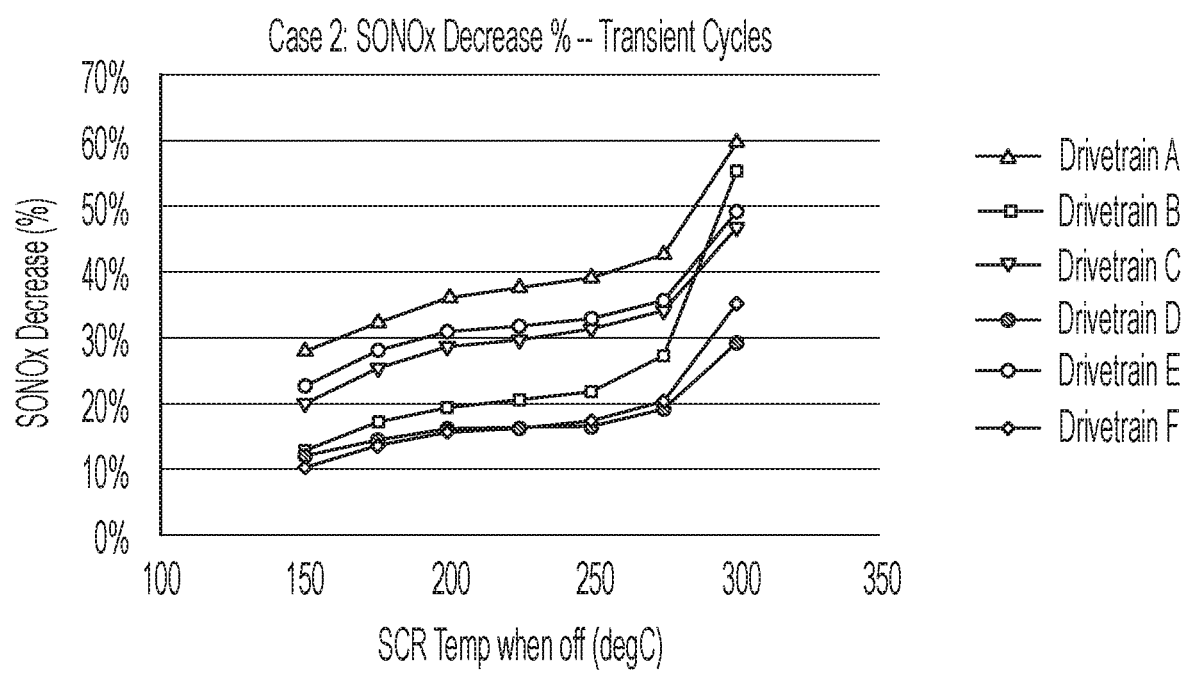
FIG. 18 is a graph illustrating the relationship between SCR temperature and SONOx decrease in transient cycles.

FIGS. 13 and 17 illustrate the respective FE increase for each drivetrain in different SCR temperature cutoffs. For example, FIG. 13 shows the FE increase in the range of 0% to 5% when the SCR temperature cutoff is at 150° C., which is roughly the same as the 30 kW power cutoff shown in FIG. 11. FIGS. 14 and 18 then illustrate the SONOx decrease in response to the SCR temperature cutoffs in FIGS. 13 and 17, respectively. As with FIGS. 12 and 16, FIGS. 14 and 18 also support a trend that higher SCR temperature generally equates to a greater SONOx decrease in all of the drivetrains assessed herein. Using these sets of figures, it is possible to also compare the difference in FE increase between steady cycles and transient cycles.

Figure 19:
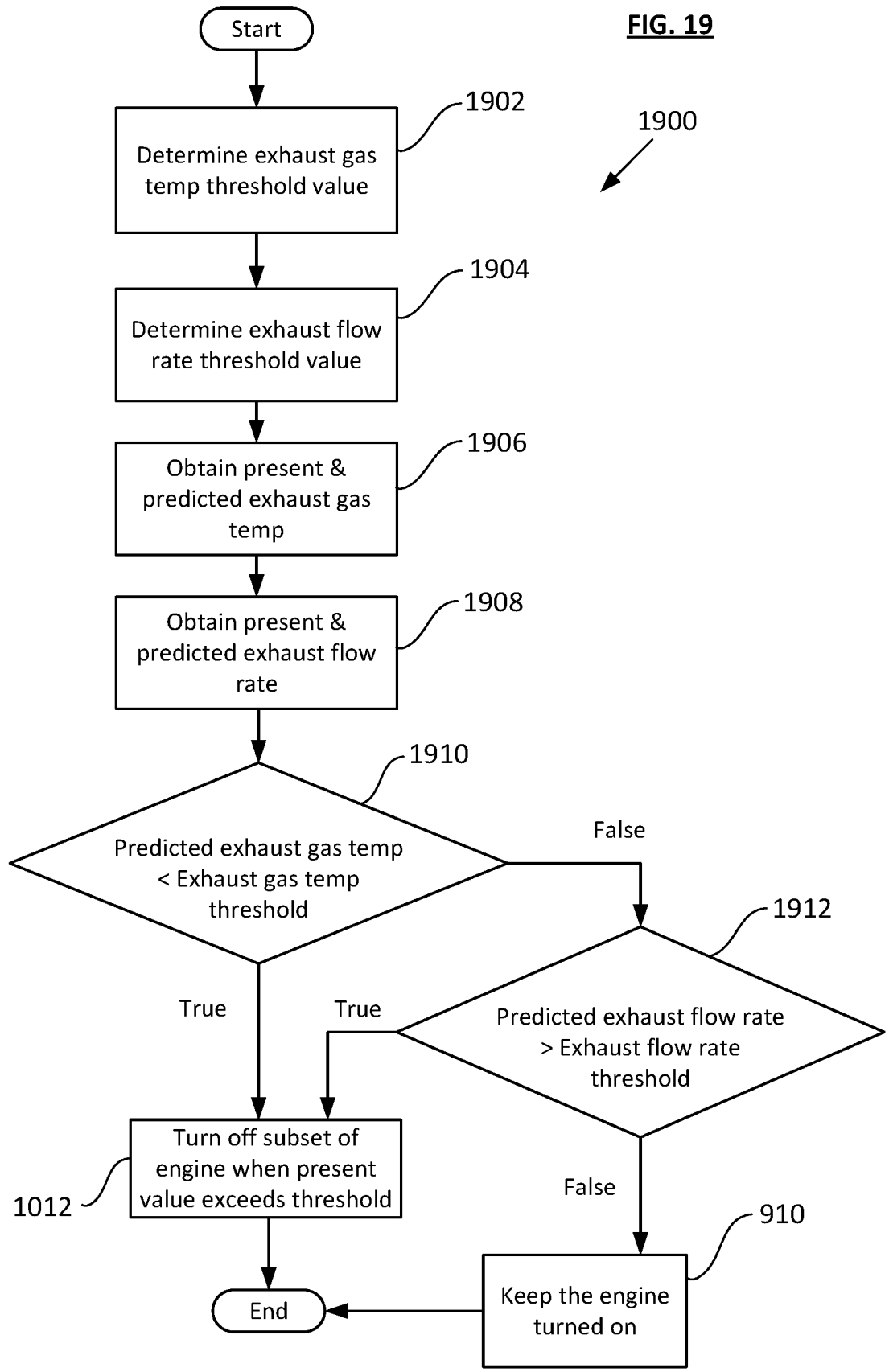
FIG. 19 is a flow diagram of a method as disclosed herein.

FIG. 19 shows another method 1900 in one embodiment to determine whether the engine is turned off or kept on using exhaust gas temperature and exhaust flow rate. In steps 1902 and 1904, the exhaust gas temperature threshold value and the exhaust flow rate threshold value are determined by the processing unit using means known in the art as explained above. Then, in step 1906, the present and predicted exhaust gas temperature values are obtained, and in step 1908, the present and predicted exhaust flow rate values are obtained. In step 1910, the processing unit determines if the predicted exhaust gas temperature is below the exhaust gas temperature threshold. If so, at least a subset of the engine is turned off in step 1012 when the present value exceeds the threshold value, i.e. when the present exhaust gas temperature reaches below the exhaust gas temperature threshold. Otherwise, the next step 1912 of determining if the predicted exhaust flow rate is above the exhaust flow rate threshold is applied. If so, at least a subset of the engine is turned off in step 1012 when the present value exceeds the threshold value, i.e. the present exhaust flow rate reaches above the exhaust flow rate threshold value. In some examples, as an alternative or in addition to the aforementioned step 1012, the method may include activating one or more of the electric motors to change the present value in order for the present value to remain below the threshold value. Otherwise, the engine is kept on in step 910. Similar to the method 1000 described above, the definition of "exceeds threshold" in step 1012 differs between when the present value refers to the present exhaust gas temperature and when it refers to the present exhaust flow rate. In the case of the exhaust gas temperature, the threshold is a lower threshold, while in the case of the exhaust flow rate, the threshold is an upper threshold.

The reason behind turning off the engine when the exhaust flow rate is above the threshold value is due to the loss of surface heat through the heat transfer as result of convection. For example, when a wind of lower temperature than an object of interest keeps passing through the object, the temperature of the object is lowered until the temperature of the object reaches the temperature of the wind. The SCR system must be maintained at a high temperature, but exhaust gas passing through the SCR system can lower the temperature. As such, when the exhaust flow rate increases too much, the amount of heat taken away from the SCR system due to convection would significantly decrease the efficiency of the SCR system. Turning off the engine to decrease the exhaust flow rate can thus help maintain a high SCR temperature.

Figure 20:
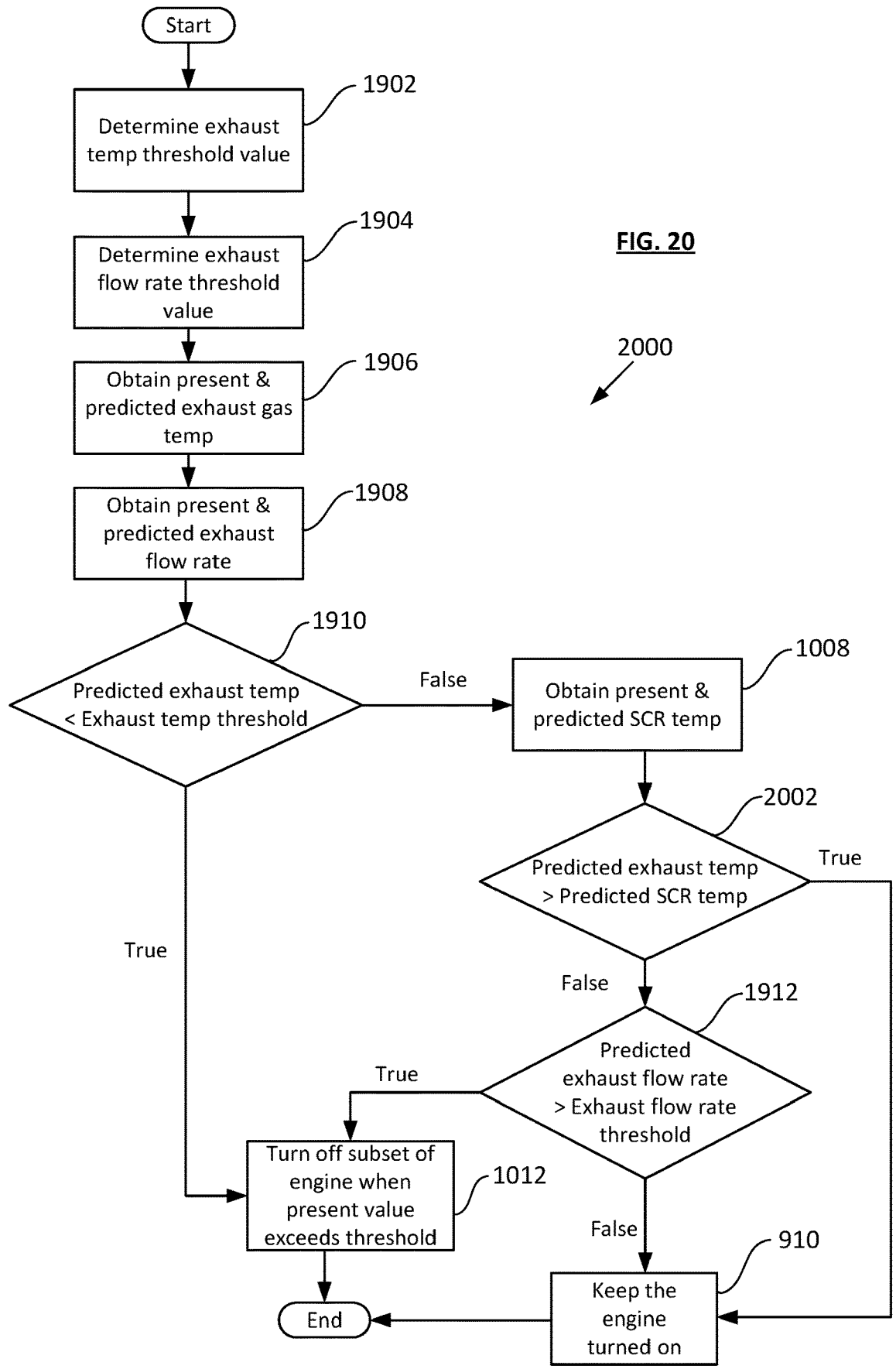
FIG. 20 is a flow diagram of a method as disclosed herein.

FIG. 20 shows a method 2000 according to one embodiment, where the method 1900 additionally implements the step 1008 of obtaining the present and predicted SCR temperatures as previously described and another step 2002 of determining whether the predicted exhaust temperature is above the predicted SCR temperature. If so, the processing unit can decide to keep the engine turned on in step 910, because maintaining the exhaust flow rate when the exhaust temperature is above the SCR temperature helps increase the SCR temperature and thereby increase the efficiency of the SCR system. Otherwise, the method 2000 proceeds to the aforementioned step 1912.

In this embodiment, the step 1012 of turning off at least a subset of the engine when the present value exceeds threshold can have various different meanings. In a first aspect of the embodiment, the step 1012 only allows the subset of the engine to be turned off when one of the aforementioned present values exceeds threshold. In some examples, as an alternative or in addition to the aforementioned step 1012, the method may include activating one or more of the electric motors to change the present value in order for the present value to remain below the threshold value. For example, if the step 1910 determines that the predicted exhaust temperature is below the exhaust temperature threshold value, the engine is turned off when the present exhaust temperature reaches below the exhaust temperature threshold value. In a second aspect of the embodiment, if the step 1912 determines that the predicted exhaust flow rate is above the exhaust flow rate threshold value, the engine is turned off when the present exhaust flow rate reaches above the exhaust flow rate threshold value and the present exhaust temperature reaches below the exhaust temperature threshold. Therefore, in the second aspect, there are two thresholds which must be exceeded for the engine to be turned off, whereas in the first aspect, there is only one threshold. In other examples, the method 2000 may include more engine states and thresholds, and the number of conditions that must be met before the engine is turned off can be adjusted as suitable based on the number and types of engine states that are involved in the process.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method for improving fuel economy and reducing emissions of a vehicle with an electric motor, an engine, and a controller, the method comprising:
    obtaining, by the controller, (1) lookahead information including a predicted temperature of an aftertreatment system operatively coupled to the engine and (2) current state information including a current hybrid control surface; and
    determining, by the controller based on the lookahead information and the current state information, a target power demand for the vehicle and a target hybrid control surface for the vehicle,
    wherein the target hybrid control surface includes a first portion of the power demand associated with the engine and a second portion of the power demand associated with the motor, and
    wherein the first portion is greater than 100% of the target power demand, and the second portion is a negative value such that a fraction of the first portion which exceeds 100% of the target power demand is converted into electrical energy via the motor.

2. The method of claim 1, further comprising:
    transitioning, by the controller, from the current hybrid control surface to the target hybrid control surface when the target hybrid control surface is different from the current hybrid control surface.

3. The method of claim 1, wherein each of the current and target hybrid control surfaces is associated with at least one of: an altitude, an environmental condition, and an internal system state of the vehicle.

4. The method of claim 1, wherein the obtaining the lookahead information includes obtaining predicted driving conditions or predicted traffic information of a route taken by the vehicle.

5. The method of claim 1, wherein the obtaining the lookahead information includes obtaining predicted changes in a mass of the vehicle.

6. The method of claim 1, wherein the obtaining the lookahead information includes obtaining predicted operating temperatures of electronics within the vehicle.

7. The method of claim 1, wherein the obtaining the lookahead information includes obtaining predicted dosing amount and, timing of a catalyst used in the aftertreatment system operatively coupled to the engine.

8. The method of claim 1, wherein the lookahead information is provided via telematics.

9. A method for improving fuel economy and reducing emissions of a vehicle with an electric motor, an engine, and a controller, the method comprising:
obtaining, by the controller, current state information;
learning, by the controller, a history of actions indicative of previous routes taken by an operator of the vehicle; and
determining, by the controller, a target power demand for the vehicle and a target state for the vehicle based on, the history of actions and the current state information,
wherein the target state includes a first portion of the power demand associated with the engine and a second portion of the power demand associated with the motor, and
wherein the first portion is greater than 100% of the target power demand, and the second portion is a negative value such that a fraction of the first portion which exceeds 100% of the target power demand is converted into electrical energy via the motor.

10. The method of claim 9, further comprising:
obtaining, by the controller, lookahead information, such that the target state is determined based on the history of actions indicative of operator behavior, the lookahead information, and the current state information.

11. The method of claim 9, wherein the history of actions indicative of operator behavior is implemented in a historically built database of road pattern expectations.

12. The method of claim 11, wherein the database is implemented in a processing unit accessible by the controller wirelessly from a remote location, wherein the processing unit is a remote server in a cloud computing environment.

13. The method of claim 10, wherein the obtaining the lookahead information includes obtaining predicted driving conditions or predicted traffic information of a route taken by the vehicle.

14. The method of claim 10, wherein the obtaining the lookahead information includes obtaining predicted changes in a mass of the vehicle.

15. The method of claim 10, wherein the obtaining the lookahead information includes obtaining predicted operating temperatures of electronics within the vehicle.

16. The method of claim 10, wherein the obtaining the lookahead information includes obtaining predicted dosing amount and timing of a catalyst used in an aftertreatment system operatively coupled to the engine.

17. A vehicle comprising:
an electric motor, an engine, and a controller operatively coupled with the electric motor and the engine, the controller configured to:
obtain (1) lookahead information including a predicted temperature of an aftertreatment system operatively coupled to the engine and (2) current state information including a current hybrid control surface;
determine, based on the lookahead information and the current state information, a target power demand for the vehicle and a target hybrid control surface for the vehicle,
wherein the target hybrid control surface includes a first portion of the power demand associated with the engine and a second portion of the power demand associated with the motor, and
wherein the first portion is greater than 100% of the target power demand, and the second portion is a negative value; and
control, based on the first portion and the second portion that are determined, the motor to convert a fraction of the first portion which exceeds 100% of the target power demand into electrical energy.

18. The vehicle of claim 17, wherein the controller is further configured to transition from the current hybrid control surface to the target hybrid control surface when the target hybrid control surface is different from the current hybrid control surface.

19. The vehicle of claim 17, wherein the lookahead information further includes predicted changes in a mass of the vehicle.

20. The vehicle of claim 17, wherein the controller is further configured to learn a history of actions indicative of operator behavior taken by an operator of the vehicle during previous trips, wherein the target state for the vehicle is further determined based on the history of actions indicative of operator behavior and the current state information.

* * * * *